(12) United States Patent
Park (10) Patent No.: US 6,988,190 B1
(45) Date of Patent: Jan. 17, 2006

(54) METHOD OF AN ADDRESS TRACE CACHE STORING LOOP CONTROL INFORMATION TO CONSERVE TRACE CACHE AREA

(75) Inventor: Sung-Bae Park, Kyunggi-do (KR)

(73) Assignee: Samsung Electronics, Co., Ltd., (KR)

( * ) Notice: Subject to any disclaimer, the term of this patent is extended or adjusted under 35 U.S.C. 154(b) by 479 days.

(21) Appl. No.: 09/714,325

(22) Filed: Nov. 15, 2000

(30) Foreign Application Priority Data

Nov. 15, 1999 (KR) .............................. 1999-50627

(51) Int. Cl.
*G06F 9/40* (2006.01)
(52) U.S. Cl. .................................... 712/241
(58) Field of Classification Search ................ 712/241, 712/233, 239; 711/125, 213
See application file for complete search history.

(56) References Cited

U.S. PATENT DOCUMENTS

| | | | | |
|---|---|---|---|---|
| 5,381,533 A | | 1/1995 | Peleg et al. .................. | 395/375 |
| 5,579,493 A | * | 11/1996 | Kiuchi et al. ................ | 712/207 |
| 6,145,076 A | * | 11/2000 | Gabzdyl et al. ............. | 712/241 |
| 6,304,962 B1 | * | 10/2001 | Nair ............................ | 712/240 |
| 6,347,383 B1 | * | 2/2002 | Elnozahy ..................... | 714/53 |
| 6,598,155 B1 | * | 7/2003 | Ganapathy et al. .......... | 712/241 |

OTHER PUBLICATIONS

Jame E. Smith and Sriram Vajapeyam, "Trace Processors: Moving to Fourth-Generation Microarchitecture," Sep. 1997 IEEE, pp. 68-74.

John D. Johnson, "Expansion Caches for Superscalar Processors," Jun. 1994 Technical Report No. CSL-TR-94-630.

Eric Rotenberg, Steve Bennett, and Kames E. Smith, "Trace Cache: a Low Latency Approach to High Bandwidth Instruction Fetching," 1996 IEEE, pp. 24-34.

Sanjay Jeram Patel, Marius Evers and Yale N. Patt, "Improving Trace Cache Effectiveness with Branch Promotion and Trace Packing," 1998 IEEE, pp. 262-271.

Sanjay Jeram Patel Daniel Holmes Friendly, and Yale N. Patt, "Evaluation of Design Options for the Trace Cache Fetch Mechanism," 1999 IEEE, pp. 193-204.

Eric Rotenberg, Steve Bennett and James E. Smith, "A Trach Cache Microarchitecture and Evaluation," IEEE 1999, pp. 111-120.

\* cited by examiner

*Primary Examiner*—Eddie Chan
*Assistant Examiner*—David J. Huisman
(74) *Attorney, Agent, or Firm*—Mills and Onello, LLP (57) ABSTRACT

A branch prediction method using an address trace is described. An address trace corresponding to an executed instruction is stored itself with a decoded form. After appointing a start address and an end address of a repeated routine, current routine iteration count and total number of iterations are compared with each other, confirming the end of the routine and storing address information of the next routine. Therefore, access information of the repeated routine can be stored using a small amount of trace cache.

1 Claim, 7 Drawing Sheets

Fig. 1

(PRIOR ART)

(PRIOR ART)

(PRIOR ART)

22

|  | A | B | A | B | A | B | A | B | A | B | A | B | A | B | A | B |
|---|---|---|---|---|---|---|---|---|---|---|---|---|---|---|---|---|
| ROUTINE 1 | A | B | A | B | A | B | A | B | A | B | A | B | A | B | A | B |
|  | A | B | A | B | A | B | A | B | A | B | A | B | A | B | A | B |
|  | A | B | A | B | A | B | A | B | A | B | C | D | E | C |
|  | D | E | C | D | E | C | D | E | C | D | E | C | D | E | C | D |
| ROUTINE 2 | E | C | D | E | C | D | E | C | D | E | C | D | E | C | D | E |
|  | C | D | E | C | D | E | C | D | E | C | D | E | C | D | E | C |
|  | D | E | C | D | E | C | D | E | F | G | F | G | F | G | F | G |
|  | F | G | F | G | F | G | F | G | F | G | F | G | F | G | F | G |
|  | F | G | F | G | F | G | F | G | F | G | F | G | F | G | F | G |
| ROUTINE 3 | F | G | F | G | F | G | F | G | F | G | F | G | F | G | F | G |
|  | F | G | F | G | F | G | F | G | F | G | F | G | F | G | F | G |
|  | F | G | F | G | F | G | F | G |

METHOD OF AN ADDRESS TRACE CACHE STORING LOOP CONTROL INFORMATION TO CONSERVE TRACE CACHE AREA

This application relies for priority upon Korean Patent Application No. 1999-50627, filed on Nov. 15, 1999, the contents of which are herein incorporated by reference in their entirety.

BACKGROUND OF THE INVENTION

1. Field of the Invention

The present invention relates to a method of storing data in an address trace cache in the environment of branch prediction.

2. Description of the Related Art

Figure 1:
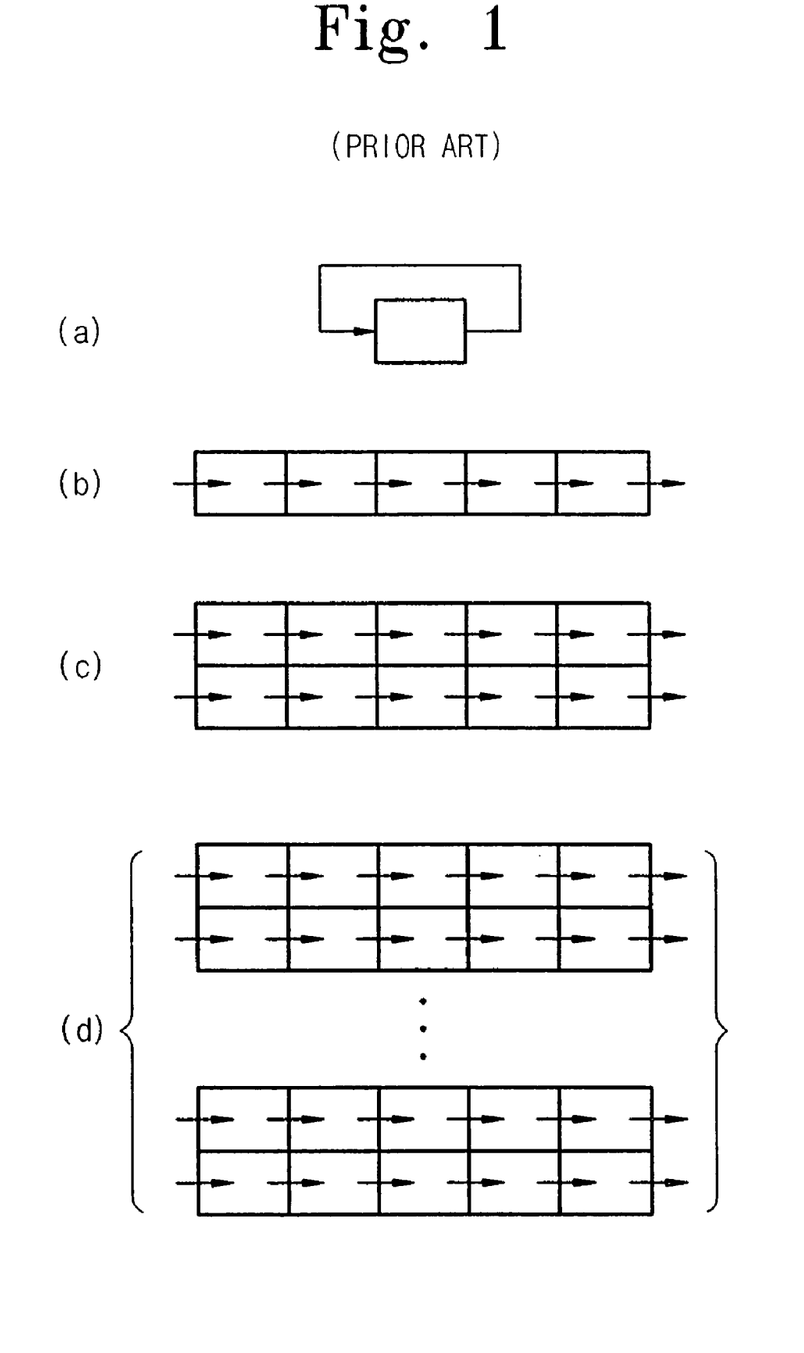
FIG. 1 contains schematic functional block diagrams which illustrate various microarchitectures including fourth-generation microarchitectures, in accordance with the prior art.

FIG. 1 shows fourth generation microarchitecture, which is cited from FIG. 1 of a paper entitled "Trace Processors: Moving to Fourth Generation Microarchitecture," IEEE Computer, pp. 68–74, September 1997, by James E. Smith & Sriram Vajapeyam. In FIG. 1, (a) is the first generation microarchitecture serial processors which began in the 1940s with the first electronic digital computers and ended in the early 1960s. The serial processors fetch and execute each instruction before going to the next. Diagram (b) is the second generation microarchitecture using pipelining. Such architectures were the norm for high-performance processing until the late 1980s. Diagrams (c) and (d) are the third and fourth generation microarchitectures that are characterized by superscalar processors. The third and fourth generation architectures first appeared in commercially available processors in the late 1980s.

As shown in FIG. 1, high-performance processors of the next generation will be composed of multiple superscalar pipelines, with some higher level control that dispatches groups of instructions to the individual superscalar pipes. The superscalar processors, which can patch a group of instructions to a cache block at the same time and process the instructions in parallel, are afflicted with performance degradation resulting from pipeline stall and abort of missed instruction rather than prediction error. Therefore, correct branch prediction is very significant to the superscalar processors.

As mentioned above, a critical technology to achieve high performance of superscalar processors is to optimally use pipelines. The most significant design factor is a branch prediction method. A branch predictor operates to predict the outcome of a branch instruction before performing a condition check of the branch instruction based on a predetermined branch prediction approach. A central processing unit (CPU) then fetches the next instruction according to the predicted result. A pipeline technique is adopted to solve a pipeline stall phenomenon that causes performance degradation of a CPU. However, when a branch prediction is missed, many instructions from the incorrect code section may be in various stages of processing in the instruction execution pipeline.

On encountering such a misprediction, instructions following the mispredicted conditional branch instruction in the pipeline are flushed, and instructions from the other, correct code section are fetched. Flushing the pipeline creates bubbles or gaps in the pipeline. Several clock cycles may be required before the next useful instruction completes execution, and before the instruction execution pipeline produces useful output. Such incorrect guesses cause the pipeline to stall until it is refilled with valid instructions, this delay is called the mispredicted branch penalty.

Generally, a processor with 5-step pipelines has a branch penalty of two cycles. For example, in 4-way superscalar design, 8 instructions are subject to loss. If a pipeline is expanded, more instructions are subject to loss and the branch penalty increases. Since programs generally branch in every 4 or 6 instructions, misprediction causes acute performance degradation in a deep pipeline design.

There have been efforts to reduce the above-mentioned branch penalty. Recently, a trace processor using a trace cache has been applied. The trace processor is disclosed in the paper "Trace Processors: Moving to Fourth Generation Microarchitecture," by James E. Smith & Sriram Vajapeyam.

Figure 2A:
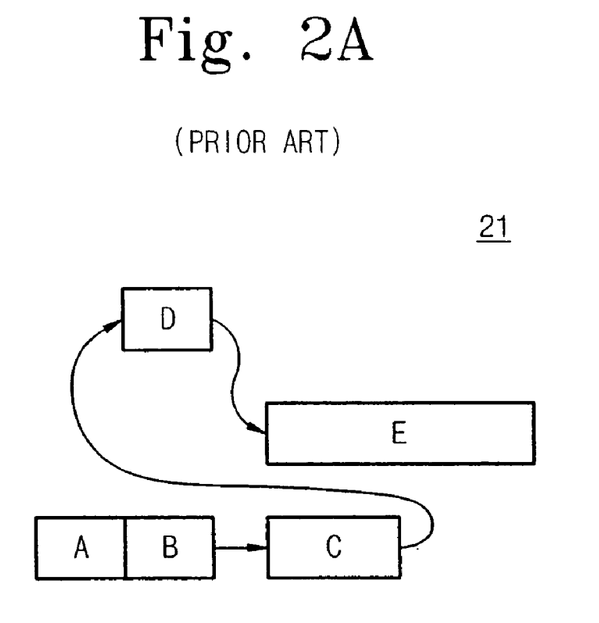
FIG. 2A is a schematic diagram which shows a dynamic sequence of basic blocks stored in a conventional instruction cache, in accordance with the prior art.
Figure 2B:
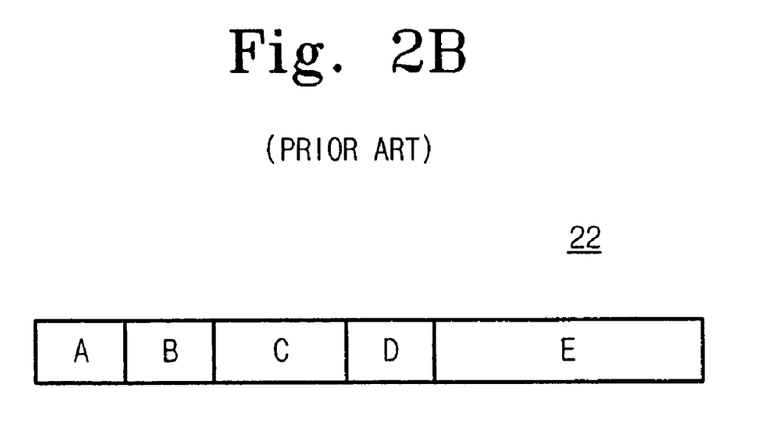
FIG. 2B is a schematic diagram which illustrates a conventional trace cache, in accordance with the prior art.

FIG. 2A shows a dynamic sequence of basic blocks embedded in a conventional instruction cache 21. FIG. 2B shows a conventional trace cache 22. Referring now to FIG. 2A, arrows indicate a branch "taken" (jumping to target code section). In the instruction cache 21, even multiple branch predictions created at every cycle require 4 cycles to fetch instructions in basic blocks "ABCDE" because instructions are stored in discontinuous caches.

Accordingly, some have proposed a specific instruction cache to capture long dynamic instruction sequences. Each line of the specific instruction cache stores a snapshot or trace of a dynamic instruction stream, as shown in FIG. 2B. This cache is referred to as a trace cache 22, which is disclosed in a paper entitled "Expansion Caches for Superscalar Processors," Technical Report CSL-TR-94-630, Stanford Univ., June 1994, by J. Johnson; U.S. Pat. No. 5,381,533 entitled "Dynamic Flow Instruction Cache Memory Organized Around Trace Segments Independent Of Virtual Address Line," issued on January 1995 to A. Peleg & U. Weiser; and a paper entitled "Trace Cache: A Low Latency Approach To High Bandwidth Instruction Fetching," Pro. 29th Int'l Symp. Microarchitecture, pp. 24–34, December 1996, by E. Rotenberg, S. Bennett, & J. Smith.

Furthermore, the trace cache 22 is disclosed in a paper entitled "Improving Trace Cache Effectiveness with Branch Promotion and Trace Packing," Proc. 25th Int'l Symp. Computer Architecture, pp. 262–271, June 1998, by Sanjay Jeram Patel, Marius Evers, and Yale N. Patt; a paper entitled "Evaluation of Design Options for the Trace Cache Fetch Mechanism," IEEE TRANSACTION ON COMPUTER, Vol. 48, No. 2, pp. 193–204, February 1999, by Sanjay Jeram Patel, Daniel Holmes Friendly & Yale N. Patt; and a paper entitled "A Trace Cache Microarchitecture and Evaluation," IEEE TRANSACTION ON COMPUTER, Vol. 48, No. 2, pp. 111–120, February 1999, by Eric Rotenberg, Steve Bennett, and James E. Smith.

A dynamic sequence, which is identical to the discontinuous blocks in the instruction cache 21 shown in FIG. 2A, is continuous in the trace cache 22 shown in FIG. 2B. Therefore, instructions stored in the trace cache 22 can sequentially be executed without repeated branch to an address including an instruction according to a conventionally programmed routine. This makes it possible to prevent a branch penalty which occurs in conventional prediction techniques. Also, instructions stored in discontinuous positions of the instruction cache 21 are contiguously stored in the trace cache to carry out improved parallel processing.

Because it stores an instruction itself, the trace cache 22 requires decoding to an address corresponding to the instruction. And because the trace cache 22 repeatedly stores even repetitively executed instructions according to their execution order, a chip size of the trace cache 22 increases too much. In order to have enough size to store all instructions, the trace cache 22 inevitably increases in chip size and manufacturing cost.

SUMMARY OF THE INVENTION

Therefore, it is an object of the present invention to provide a branch prediction approach using a trace cache, which can shorten address decoding time and decrease chip size and manufacturing cost.

According to the aspect of the present invention, a branch prediction method uses a trace cache. If a routine composed of unrepeated instructions is to be executed, an address corresponding to each instruction in the trace cache according to an order of executed instructions is stored. If a routine composed of repeated instructions is carried out, a routine start address, a routine end address, current iteration count of the routine, and total number of iterations of the routine are counted and stored.

If the routine composed of the repeated instructions is carried out, the trace cache includes loop counters for counting the current iteration count and the total number of iterations. If values of the loop counters are identical to each other, a start address that will be subsequent to the routine is addressed. If the branch prediction is missed, the loop counter is recomposed using the latest updated loop count value.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS OF THE INVENTION

A new and improved trace cache stores an address trace itself corresponding to an instruction with a decoded form, thus shortening address decoding time for each instruction. The new and improved trace cache uses a small amount of trace cache memory in storing an address trace to a repetitively executed routine, thus decreasing chip size and manufacturing cost.

Figure 3:
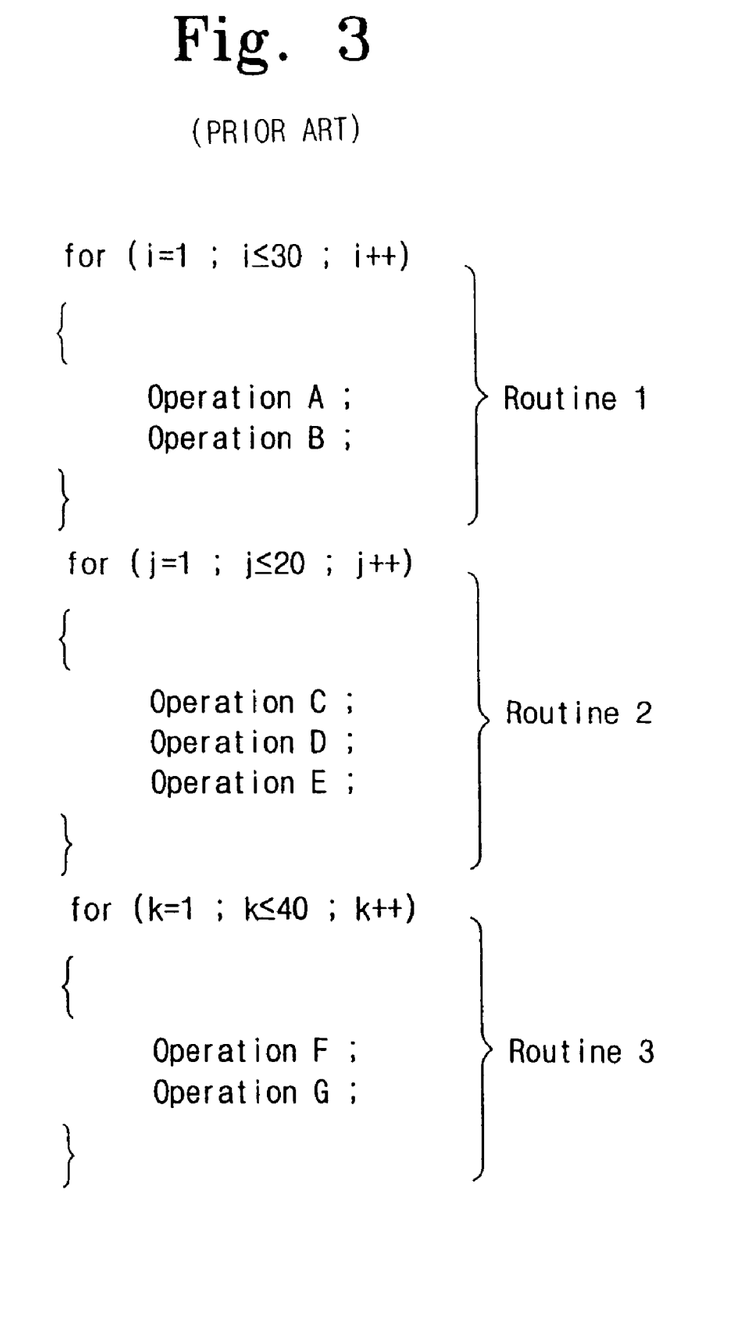
FIG. 3 is a schematic diagram which illustrates one example of a repetitive instruction pattern in accordance with the prior art.

FIG. 3 illustrates one example of a repetitive instruction pattern. In a routine 1, operations A and B are repeated 30 times. When the routine 1 is finished, a routine 2 is carried out wherein operations C, D, and E are sequentially repeated 20 times. When the routine 2 is finished, a routine 3 is carried out wherein operations F and G are repeated 40 times.

Figure 4:
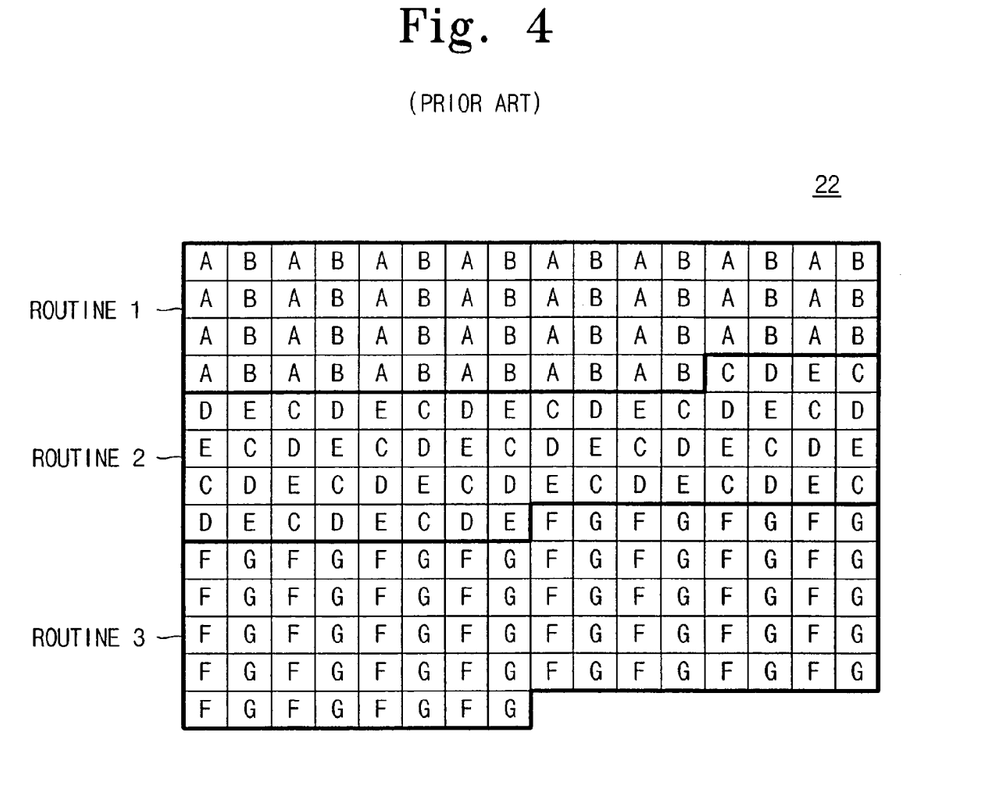
FIG. 4 is a schematic diagram which illustrates a pattern where instructions shown in FIG. 3 are stored in a trace cache according to prior art.

Assuming that, for example, the routines shown in FIG. 3 are carried out, FIG. 4 shows instructions that are stored in a trace cache 22 according to prior art. Referring now to FIG. 4, the trace cache 22 stores instructions based upon their execution order irrespective of the fact that executed instructions are repeatedly carried out. Accordingly, the trace cache 22 requires a data storing area for storing 60 instructions (2 instructions×30 times repetition=60) for routine 1, a data storing area for storing 60 instructions (3 instructions×20 times repetition=60) for routine 2, and a data storing area for storing 80 instructions (2 instructions×40 times repetition=80) for routine 3. That is, a total of 200 data storing areas are required for storing instructions for routines 1, 2, and 3 shown in FIG. 3. If 32 bits are required for storing each of the instructions, a data storing area of total 6400 bits (i.e., 800 bytes) is required for routines 1, 2, and 3.

Figure 5:
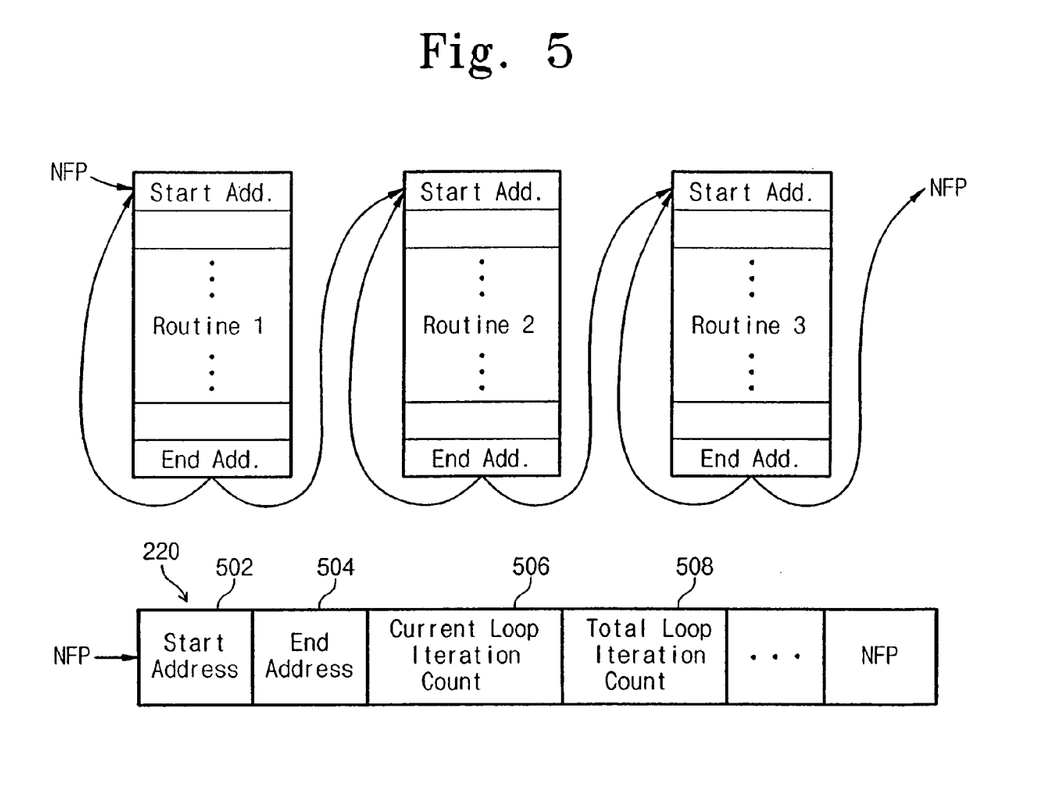
FIG. 5 is a schematic diagram which illustrates a structure of an address trace cache according to the present invention.

In FIG. 5, in accordance with the invention, an address trace cache 220 comprises a start address storing area 502 for storing a start address where each routine is started, an end address storing area 504 for storing an end address where each routine is finished, a current loop iteration counter for generating a current iteration count 506 of a corresponding routine, and a total loop iteration count 508 for indicating total number of iterations of the routine. That is, the total loop iteration count is a stored value indicating the total number of iterations of the routine to be executed.

For example, if the information related to instructions executed in routine 1 is indicated in the address trace cache 220, the start address and the end address of routine 1 are stored in the trace cache 220. Then, current iteration count of routine 1 is stored in the current iteration loop counter while total number of iterations (e.g., 30 times) of routine 1 is stored in the total loop iteration count. As execution of the routine is repeated, a value of the current loop iteration counter is increased. If the value of the current loop iteration counter is identical to that of the total loop iteration count, routine 1 is finished and a start address of routine 2 is stored as a next fetch point (NFP).

As shown in FIG. 3 and FIG. 5, if routine 1 through 3 are successively carried out, they can be stored in the address trace cache 220 by the above-mentioned manner, respectively. If routines 1 through 3 are not repeatedly carried out, the address of each instruction composing routines 1 through 3 is sequentially written therein. When branch prediction is missed, the loop counter is recomposed with the latest updated loop count value.

Figure 6:
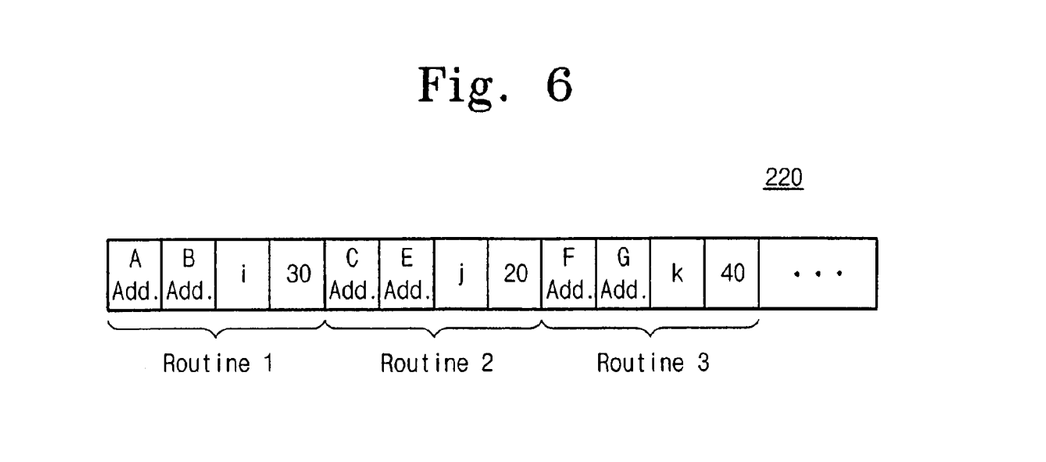
FIG. 6 is a schematic diagram which illustrates a pattern where instructions shown in FIG. 3 are stored in a trace cache according to the present invention.

Referring now to FIG. 6, if, for example, a routine 1 shown in FIG. 3 is stored in the address trace cache 220, an address of an initially executed instruction A is stored into a start address of routine 1 while an address of a finally executed instruction B is stored into an end address thereof. Since the total number of iterations or repetitions of the routine 1 is 30, the value of the total loop iteration count is stored as 30. Whenever routine 1 is repeatedly carried out, a value of the current loop iteration counter increases by 1. In the same manner, information of routines 2 and 3 is stored in the address cache 220.

As shown in FIG. 6, since the address cache 220 is composed of an address where each routine is started, an address where each routine is finished, a current loop iteration counter, and a total loop iteration counter, only four data storing areas are required to store information of a repeated routine. Therefore, a total of 12 data storing areas are required to store routines 1 through 3 in the address trace cache 220. In this case, if 32 bits are utilized to store each piece of information, a total of 384 bits (i.e., 48 bytes) are required to store routines 1 through 3. This is smaller by about 16.7 times than a data storing area utilized in a conventional trace cache.

Figure 7:
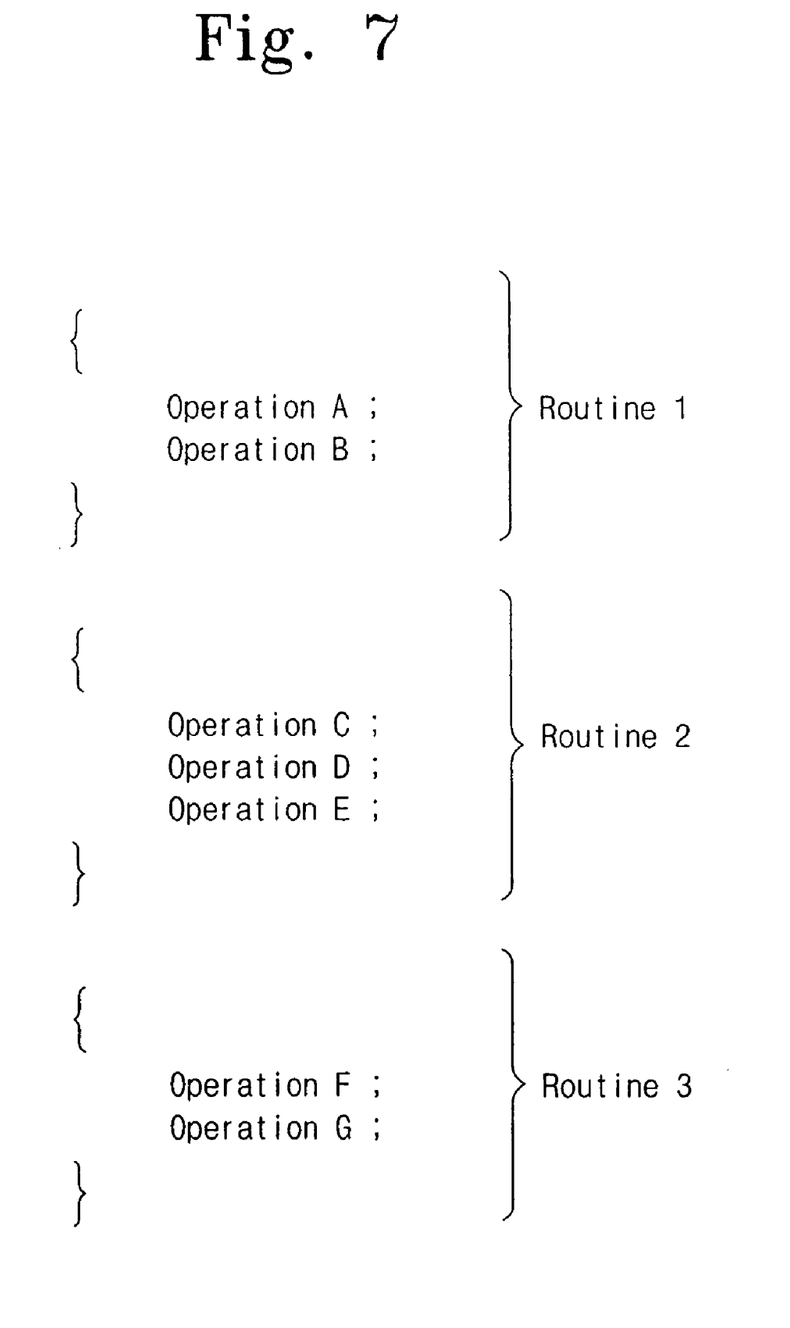
FIG. 7 is a schematic diagram which illustrates one example of a nonrepetitive instruction pattern.
Figure 8:
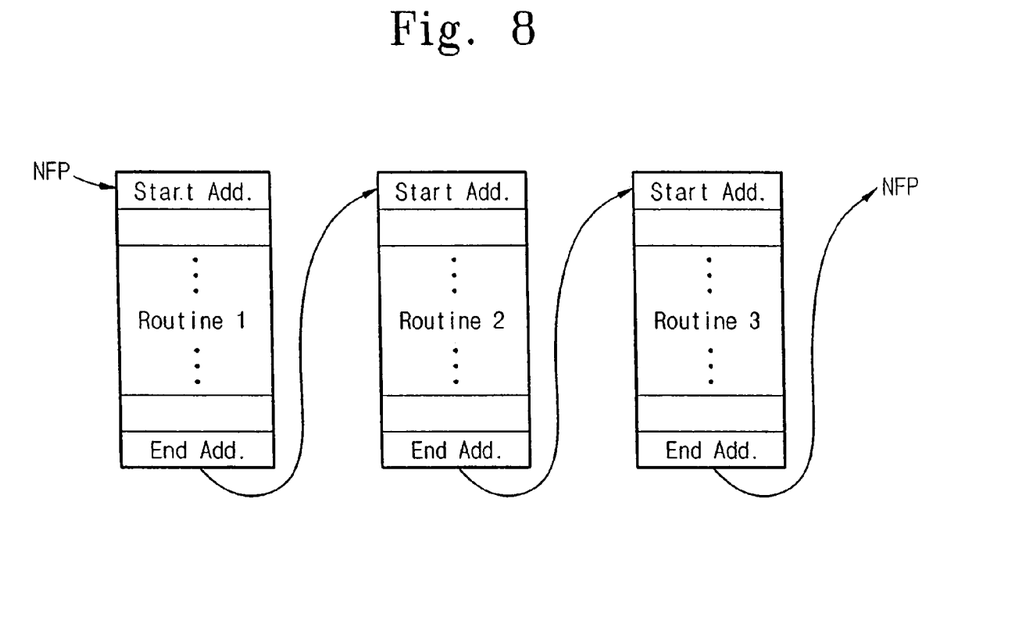
FIG. 8 is a schematic diagram which illustrates a structure of an address trace cache according to the present invention storing the instructions of FIG. 7.
Figure 9:
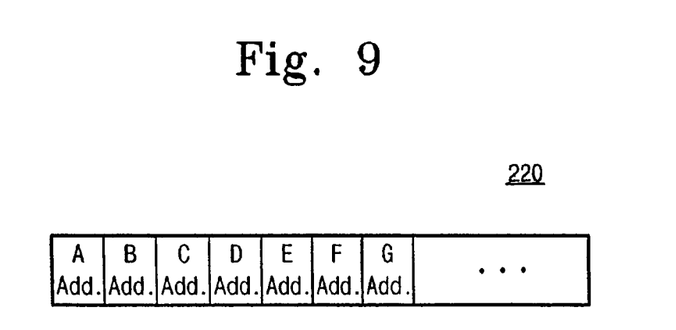
FIG. 9 is a schematic diagram which illustrates a pattern where instructions shown in FIG. 7 are stored in a trace cache according to the invention.

FIGS. 7 through 9 illustrate handling instructions in a routine that is not to be repeated in accordance with the invention. FIGS. 7 through 9 are analogous to FIGS. 3, 5, and 6, respectively, which illustrate handling of repeated instructions. FIG. 7 is a schematic diagram which illustrates one example of a nonrepetitive instruction pattern. FIG. 8 is a schematic diagram which illustrates a structure of an address trace cache according to the present invention storing the instructions of FIG. 7. FIG. 9 is a schematic diagram which illustrates a pattern where instructions shown in FIG. 7 are stored in a trace cache according to the invention.

Such an effect may be significant, as the number of repeated instructions in a routine becomes large or the number of repetitions of instructions rises. A trace cache of this invention utilizes a data storing area that is considerably reduced in comparison with a conventional trace cache, resulting in decreased chip size and manufacturing unit price. Moreover, the trace cache stores an address trace itself to each instruction with a decoded form, reducing an address decoding time of the instruction.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A method of executing instructions using an address trace cache in a branch prediction environment comprising the steps of:
   if a first routine of a plurality of routines composed of a first group of instructions is to be executed, storing an address corresponding to each instruction in the address trace cache according to an order of executed instructions;
   if a second routine of the plurality of routines composed of a second group of instructions is to be repeatedly executed, storing a routine start address in a first storing area of the address trace cache, storing a routine end address in a second storing area of the address trace cache, storing a current iteration count of the second routine representing a current number of executed iterations of the second routine in a third storing area of the address trace cache, and storing a total loop iteration count in a fourth storing area of the address trace cache;
   providing the address trace cache with a current loop iteration counter for counting the current iteration count when the second routine of repeated instructions is executed and the total loop iteration count for representing the total number of iterations of the second routine of repeated instructions; and
   incrementing the current iteration count for each executed iteration of the second routine, wherein when the current iteration count and the total loop iteration count representing the total number of iterations are identical, the second routine is finished, and a next routine composed of a next group of instructions to be repeatedly executed is initiated by addressing a start address in a next first storage area of the next routine, and wherein the address trace cache provides a first storing area, second storing area, third storing area, and fourth storing area for each routine composed of a group of instructions to be repeatedly executed.

* * * * *